United States Patent
Drnevich et al.

(10) Patent No.: US 6,343,462 B1
(45) Date of Patent: Feb. 5, 2002

(54) GAS TURBINE POWER AUGMENTATION BY THE ADDITION OF NITROGEN AND MOISTURE TO THE FUEL GAS

(75) Inventors: Raymond Francis Drnevich, Clarence; M. Mushtaq Ahmed, Pittsford, both of NY (US)

(73) Assignee: Praxair Technology, Inc., Danbury, CT (US)

( * ) Notice: Subject to any disclaimer, the term of this patent is extended or adjusted under 35 U.S.C. 154(b) by 0 days.

(21) Appl. No.: 09/191,945

(22) Filed: Nov. 13, 1998

(51) Int. Cl.$^7$ .............................. F02C 3/30; F02C 7/224
(52) U.S. Cl. .................... 60/39.05; 60/39.53; 60/39.55; 60/736
(58) Field of Search ............................. 60/39.05, 39.53, 60/39.54, 39.55, 736

(56) References Cited

U.S. PATENT DOCUMENTS

| | | | |
|---|---|---|---|
| 3,731,485 A | * 5/1973 | Rudolph et al. | 60/39.53 |
| 4,829,763 A | 5/1989 | Rao | 60/39.05 |
| 5,241,816 A | 9/1993 | Drnevich | 60/39.53 |
| 5,251,433 A | * 10/1993 | Wallace | 60/39.05 |
| 5,319,924 A | * 6/1994 | Wallace et al. | 60/39.02 |
| 5,345,756 A | * 9/1994 | Jahnke et al. | 60/39.02 |
| 5,394,686 A | * 3/1995 | Child et al. | 60/39.02 |
| 5,406,786 A | 4/1995 | Scharpf et al. | 60/39.05 |
| 5,632,148 A | 5/1997 | Bronicki et al. | 60/728 |
| 5,666,800 A | * 9/1997 | Sorensen et al. | 60/39.02 |
| 5,715,671 A | * 2/1998 | Griffiths | 60/39.02 |
| 5,852,925 A | * 12/1998 | Prasad et al. | 60/39.07 |

OTHER PUBLICATIONS

Irwin Stambler, "Spray cooling inlet and compressor flow increases hot day plant rating", *Gas Turbine World*, May–Jun. 1997, pp. 37, 39, 40, 42.

M.deLucia et al, "Benefits of Compressor inlet Air Cooling for Gas Turbine Cogeneration Plants", *Journal of Engineering for Gas Turbines and Power*, Jul. 1996, vol. 118/603.

I.G. Rice, "Steam–Injected Gas Turbine Analysis: Steam Rates", *Journal of Engineering for Gas Turbines and Power*, Apr. 1995, vol. 117.

Michael A. Davi, "GE Gas Turbine Combustion Flexibility", *GE Power Generation* Ger–3946, 11/96.

J. De Ruyck, "REVAP® Cycle: A New Evaporativ Cycle Without Saturation Tower", *Journal of Engineerin for Gas Turbines and Power*, Oct. 1997, vol. 119.

* cited by examiner

Primary Examiner—Ted Kim
(74) Attorney, Agent, or Firm—Blake T. Biederman

(57) ABSTRACT

A method and apparatus for increasing power output and efficiency of gas turbines. Power output is enhanced and NOx emissions are lowered while heat rate penalties are minimized by adding nitrogen or a mixture of nitrogen and water vapor to the gas turbine in conjunction with the use of low pressure steam.

12 Claims, 5 Drawing Sheets

GAS TURBINE POWER AUGMENTATION BY THE ADDITION OF NITROGEN AND MOISTURE TO THE FUEL GAS

BACKGROUND OF THE INVENTION

Industrial electric power generation gas turbines are designed to operate over a pre-specified range of ambient temperature, barometric pressure, fuel calorific value, and steam injection rate. This operational flexibility is realized by designing the gas turbine air compressor and hot gas expander to operate effectively over a range of flows and pressure ratios. At most operating points, the air compressor limits the capacity of the gas turbine, while, at some other points, the hot gas expander is limiting. The net result of this operational flexibility is unused gas turbine capacity, and/or higher heat rate.

The prior art has attempted to devise thermodynamic cycles and process equipment arrangements that increase power output and/or minimize heat rate (efficiency) penalties. In many cases the primary focus has been on increasing the mass flow of air by cooling (lower suction temperature, higher density) or by humidification. The practice of intercooling to reduce compression energy consumption also has been considered.

Gas turbine manufacturers primarily have focused on improving the gas turbine mechanical design and process control technology to deliver lower heat rates, reduced NOx and CO emissions, higher reliability and reduced maintenance. Historically, the practice of water or steam injection in gas turbines has been utilized for NOx emissions control that also results in power augmentation as a secondary benefit. Steam injection solely for power augmentation is also commonly practiced. However, with the development of Dry Low NOx (DLN) units, the usage of water or steam injection for NOx emissions control has decreased.

A gas turbine operating system has been developed including an integrated air separation and gas turbine process that returns high purity or waste nitrogen product from the air separation plant for injection into the gas turbine. Another prior art system incorporates an integrated air separation gasification/partial oxidation gas turbine process that separates a portion of gas turbine air in the air separation plant to make oxygen and nitrogen products; uses the oxygen to gasify or partially oxidize a carbonaceous fuel to make syngas; burns the syngas in the gas turbine combustor; and returns nitrogen product for injection into the gas turbine compressor discharge, and/or combustor.

While such prior art approaches have proven useful in increasing power output and/or enhancing efficiency, there remains a need for a more efficient and effective technique and apparatus for increasing the power output and lowering NOx emissions, while minimizing heat rate penalties.

SUMMARY OF THE INVENTION

Now, an improved apparatus and process has been developed for enhancing the power output of gas turbines while lowering NOx emissions and minimizing heat rate penalties.

The invention enables power augmentation with potentially lower NOx emissions. In practice, a fuel gas mixture containing pre-set concentrations of fuel and diluent such as nitrogen and water vapor is prepared and used. Thermal properties of the fuel mixture are tuned by adjusting the concentrations of water vapor (relatively higher heat capacity) and nitrogen. The fuel gas mixture is delivered superheated to a fuel gas manifold of a gas turbine combustor unit. Depending on the gas turbine design, this fuel gas mixture needs to be delivered at a pressure sufficiently greater than the gas turbine combustor operating pressure. For some gas turbines this means the fuel should be at a pressure in the range of 150 psia to 300 psia, where as for some others greater than 300 psia. This invention enables the use of low pressure steam (steam whose pressure is less than that of the required fuel gas mixture delivery pressure) to prepare a fuel gas mixture with desired water vapor content and superheat. The fuel gas mixture is prepared by moisturizing the nitrogen gas and then mixing moist nitrogen with fuel. The moisture for this purpose is derived from steam at a pressure of 30 psia or greater but not exceeding the gas turbine fuel delivery pressure. For most commercially available gas turbines the preferred steam pressure is at least 50 psi below the gas turbine fuel delivery pressure. Moisturization is accomplished by contacting nitrogen and hot water in a countercurrent contactor with appropriate design and engineering features to obtain high mass transfer rates with minimum pressure losses. The water vapor content in the moist nitrogen can be as high as 60 mole %, preferably in the 30–50 mole % range. The moist nitrogen gas is superheated prior to mixing with fuel such as natural gas to prevent condensation. The mixing is accomplished such that fuel gas mixture of consistent calorific value and composition is obtained. The fuel content in the fuel gas mixture can be 25 to 75 mole %, and preferably 35–50 mole %. The resulting fuel gas mixture is superheated to obtain 50 F superheat to avoid condensation in the gas turbine fuel gas manifold system. This invention enables the use of low pressure steam as both the source of moisture, as well as the source of thermal energy. This invention also enables deriving moisture primarily from a low pressure steam, and using a relatively higher pressure steam as the source of additional moisture and/or thermal energy. This invention, however does not preclude the use of relatively higher pressure steam as the primary source of moisture and/or thermal energy. Low grade heat such as low pressure steam is utilized to the maximum possible extent to minimize heat rate penalties.

Compared to air cooling or air humidification, this invention offers more rangeability in the amount of additional mass that can be injected into the gas turbine. The invention does not depend on the integration of the air separation plant and the gas turbine. The invention can use nitrogen supplied by pipeline from a remotely located air separation plant or from an on-site plant. The invention does not depend on the technology used for air separation such as cryogenic distillation, or pressure swing adsorption, or vacuum pressure swing adsorption, or membrane technology. The invention can use both high purity nitrogen product (less than 10 ppm oxygen), as well as lower purity nitrogen product such as the waste nitrogen stream in an air separation plan (<5% oxygen).

The disclosed invention enables enhancing the power output of the gas turbines over a range of operating conditions. It is particularly applicable to situations were the gas turbine compressor is the bottleneck due to site conditions. It is also particularly applicable where significant low grade heat such as low pressure saturated steam at 50 to 200 psig is available.

DETAILED DESCRIPTION OF PREFERRED EMBODIMENTS

The term low pressure steam used herein refers to steam whose pressure is less than the gas turbine manufacturers' specified minimum fuel delivery pressure.

Figure 1:
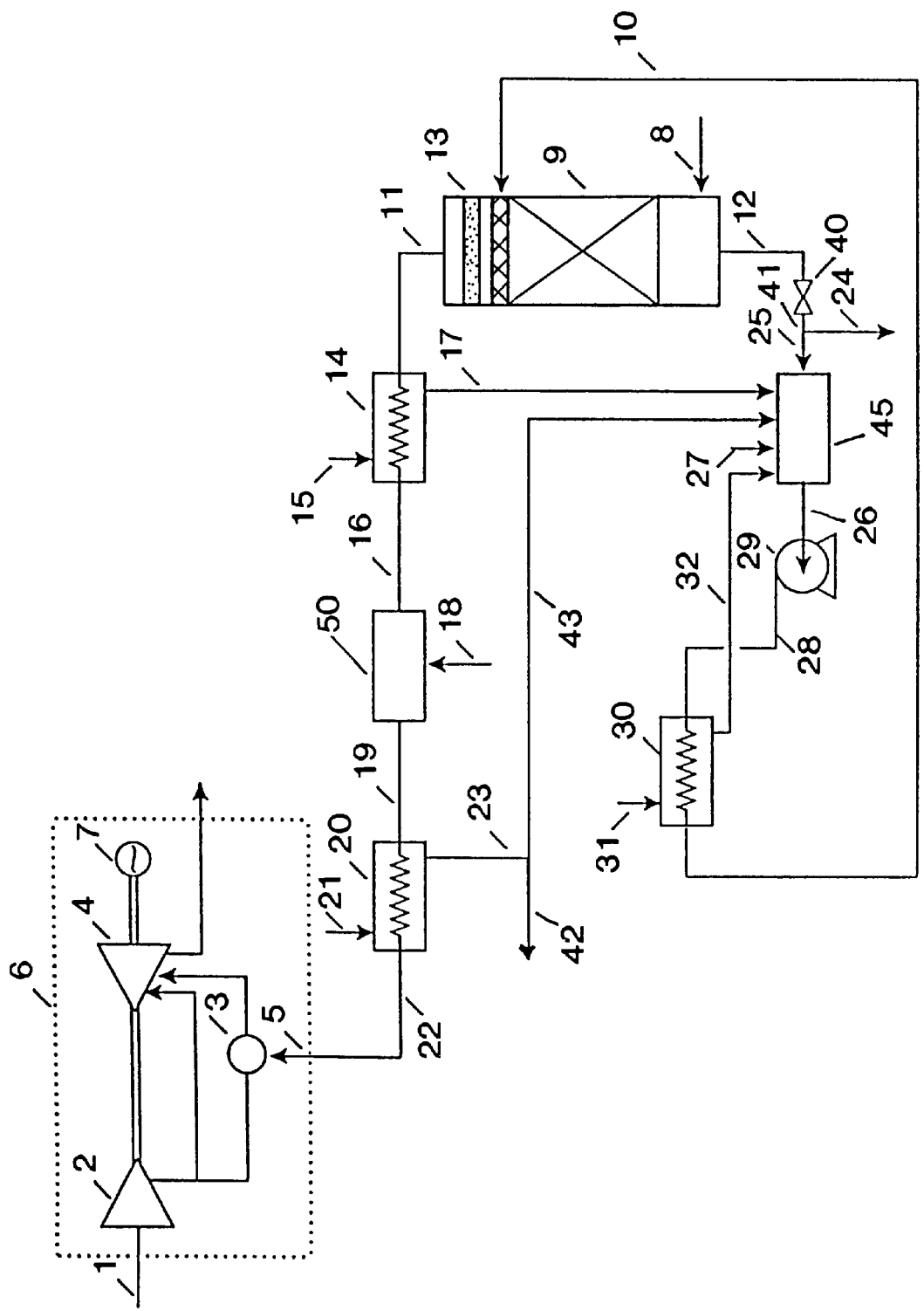
FIG. 1 is a schematic of a first embodiment of the present invention whereby the power output of a gas turbine is increased through the use of a superheated mixture of nitrogen and water vapor using low level heat.

FIG. 1 is a schematic representation of the first embodiment of the invention for increasing the power output of a gas turbine using superheated mixture of moisturized nitrogen and fuel such as natural gas. Air through line 1 is introduced into the gas turbine air compressor, 2, pressurized, and split into two portions. One portion, from hereon referred to as combustion air is fed to the combustor, 3, and the second portion, from hereon referred to as the cooling air is fed to the hot gas expander, 4, to cool the blades below gas turbine manufacturers specified maximum temperature.

Superheated fuel gas mixture comprising fuel, nitrogen and water vapor through manifold system, 5 is introduced into the combustor, 3, where fuel components in the mixture react with oxygen in the combustion air. The presence of diluents, nitrogen and water vapor in the fuel will result in cooler flames, and consequently lower NOx emissions. Except for minor heat loss in the combustor, heat released from combustion reactions is absorbed by the combustion product, excess combustion air, and the diluents (nitrogen and water vapor in the fuel, and any other inert components such as CO2 introduced with the fuel). The resulting hot gases flow into the expander, 4, and serve as the working fluid. At some point in the expander, 4, the hot combustion products and the cooling air are totally mixed together, and leave the gas turbine assembly, 6. The work output of the hot gas expander is utilized to drive the air compressor, 2, and the electricity generator, 7 (or alternately a load).

The exhaust gases from the hot gas expander, 4 contain significant thermal energy at high temperature levels, which can be recovered in a variety of ways already known in the art.

The fuel gas mixture fed through manifold system, 5 is prepared by moisturizing nitrogen gas and mixing moist nitrogen with fuel. Nitrogen from line 8 is fed to the bottom of a packed or trayed tower, 9, from hereon referred to as the saturator. A pumped circulating water circuit, 10, serves as the source of moisture and thermal energy to obtain a mixture of water vapor and nitrogen leaving at the top of the saturator, through line 11. The relatively cooled water stream leaves at the bottom of the saturator through line 12. The saturator, 9, contains a mist elimination section, 13, at the top to prevent liquid water entrainment.

The mixture of nitrogen and water vapor from the saturator, 9, is superheated in a heat exchanger, 14, from hereon referred to as diluent superheater. Low pressure steam from line 15 serves as the source of thermal energy to achieve the desired degree of superheat (to avoid condensation upon mixing with fuel from line 18). The superheated mixture of nitrogen and water vapor leaves the diluent superheater through line 16. The steam after completing its heating duty leaves through line 17.

The superheated mixture of nitrogen and water vapor from line 16 is mixed with fuel gas from line 18 in 50 which may be a pipe or specially designed mixing unit. The resulting mixture of fuel gas, nitrogen and water vapor is fed via line 19 to a heat exchanger, 20, from hereon referred to as fuel heater. Low pressure steam from line 21 serves as the source of thermal energy to achieve the desired degree of superheat (to avoid condensation in the fuel gas manifold, 5). The superheated fuel gas mixture leaves the fuel heater through line 22 on its way to the gas turbine fuel gas manifold, 5. The steam after completing its heating duty leaves through line 23.

Valve, 40 is used to reduce the pressure of the water leaving through line 12 from the saturator to permit use of low pressure steam as the source of moisture and heat. A small portion of the water from the saturator, 9 is discharged as blowdown through line 24 to prevent buildup of impurities in the circulating water, and to maintain the desired recycle rate. The remaining water through line 25 is mixed with steam/condensates from diluent superheater 14 line 17, fuel heater 20 line 43, recycle water heater 30 line 32, and make-up water (or low pressure steam) through line 27. The pump 29 with suction line 26 and discharge line 28 is used to pump the recycle water to a sufficient pressure for feeding to the saturator. A separator (not shown) is installed between the saturator and the pump to assure there is no vapor in the suction line. The recycle water is heated to a target temperature to accomplish the desired moisturization level in the saturator overhead gas. Low pressure steam through line 31 is used to heat the water in heater 30.

With reference to FIG. 1, the invention includes the process of creating a moist nitrogen stream, from hereon referred to as the moist diluent stream using a circulating water circuit and steam in conjunction with the apparatus depicted as saturator, 9, and direct contact water heater, 45. The intent is to deliver a diluent gas of pre-set and controlled composition with respect to the nitrogen and water vapor contents for mixing with the fuel. The saturator, 9, is a continuous countercurrent packed or trayed contactor, operating at a pressure suitable for delivery of the gas to the gas turbine combustor without additional compression. Pumped hot water, the liquid phase flows downwardly by gravity and contacts the rising nitrogen gas. The nitrogen gas is fed to the saturator at ambient temperature, but at sufficient pressure to facilitate good gas-liquid contacting. The saturator design accommodates the expected variations in liquid flow rates required to deliver the desired range of water vapor content in the moist diluent gas. For a gas turbine generating 70 MW, the saturator will be nominally 5 to 6 feet in diameter, and 15 to 30 feet tall.

A portion of the water leaving the bottom of the saturator, 9, is discharged as blowdown to minimize the buildup of impurities in the water circuit. The remainder of the water is fed to the direct contact heater, 45 for recycle. Low pressure steam and single or two phase H2O streams leaving the moist diluent superheater and the fuel heater serve as the source of make-up water, as well as the source of thermal energy required to carry out the above process. The pressure level of the direct contact heater is selected such that low pressure steam vapor venting is eliminated. Heat recovery exchangers, not shown in FIG. 1, can be installed to recover heat from the blowdown stream.

With reference to FIG. 1, the invention includes the process to create superheated fuel gas in conjunction with the apparatus depicted as the moist diluent superheater and the fuel heater. The saturator, 9 overhead gas mixture of nitrogen and water vapor at dew point is superheated using appropriate pressure level steam. The intent is to minimize condensation upon contacting the diluent gas with the fuel gas (for example natural gas). The mixed gas stream is then superheated in the fuel heater to attain a superheat at the gas turbine combustor fuel gas manifold recommended by the gas turbine manufacturer. Typically the minimum superheat level recommended by the gas turbine manufacturers is 50° F. The process is therefore designed to efficiently use higher level heat (higher pressure steam).

With reference to FIG. 1, the invention includes the process to deliver fuel gas that conforms to the fuel interchangeability standards established by the gas turbine manufacturer. One such standard is the Wobbe Index, which is defined by General Electric as the ratio of the lower heating value of the fuel gas divided by the square root of the product of specific gravity and temperature at the fuel gas manifold. Typically the fuel gas manifold is designed to accommodate variations of the order of 5–10% of the Wobbe Index. Greater variations are handled by the use of a separate fuel gas manifold, and/or by other built-in engineering features in the manifold. In accordance with the invention, fuel content in the gas delivered to fuel gas manifold can be maintained at pre-set values while adjusting the nitrogen and water vapor content subject to the constraints imposed by allowable variations in Wobbe Index. This enables tuning the thermal properties of the fuel gas by taking advantage of the differences in the heat capacity of steam, nitrogen and fuel components.

The invention described above also enables the use of relatively higher pressure steam (steam whose pressure is greater than the fuel delivery pressure to the gas turbine) as a source of thermal energy, as well as moisture. If the steam used in the diluent superheater, 14 is at sufficiently higher pressure, then the steam/condensate leaving through line 17 can be directly routed to the saturator, 9. If the steam used in the fuel heater, 20, is at sufficiently higher pressure, then the steam/condensate through line 23 can be directly routed to the saturator, 9. If the steam used in recycle water heater, 30 is at sufficiently higher pressure, then the steam/condensate leaving through line 32 can be directly routed to the saturator, 9. To those skilled in the art it is also obvious that the steam/condensate through lines 17, 23 and 32 individually or combined can also be routed through line 42 for other uses.

It is also obvious to those skilled in the art that this invention can be practiced in conjunction with the injection of moist nitrogen into the gas turbine at one or more locations. This feature provides the flexibility to increase the power output while controlling the concentration of diluents in the gas turbine fuel to assure stable combustion. This embodiment is inclusive of variants in which all or some or none of the diluent (nitrogen or moist nitrogen which is a mixture of nitrogen and water vapor) is injected into the combustor, or turbine.

Figure 2:
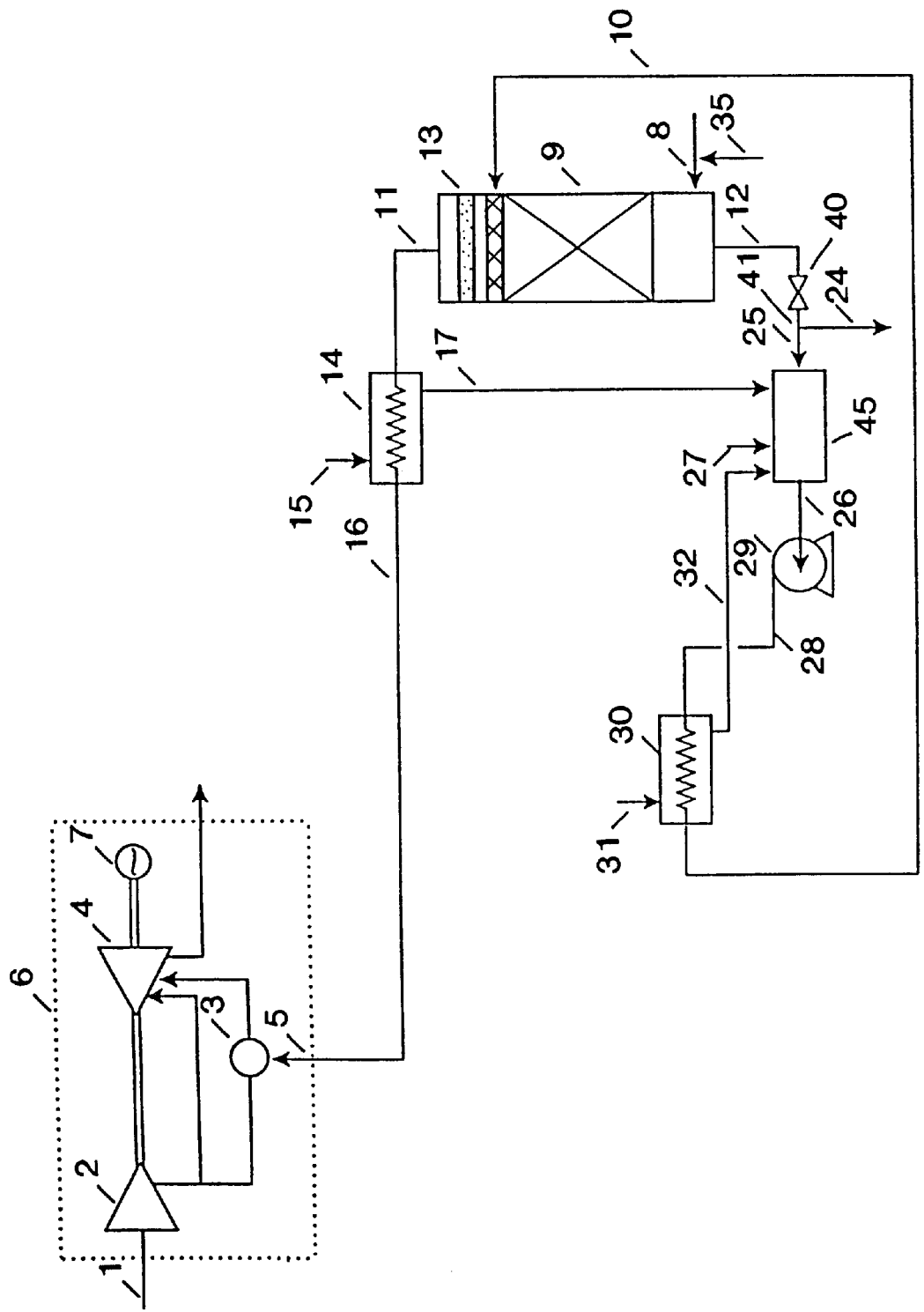
FIG. 2 is a schematic of another embodiment of the invention wherein both a higher calorific fuel and nitrogen are fed to the saturator.

FIG. 2 is an alternate schematic representation of the invention for increasing the power output of a gas turbine and lowering NOx emissions. Both higher calorific value fuel such as natural gas through line 35 and nitrogen through line 8 is fed to the saturator 9. The moisturized nitrogen and fuel mixture is then superheated and fed to the combustor. This embodiment requires less process equipment such as heat exchangers, however, water discharged as blowdown may require special treatment to handle hydrocarbon and sulfur containing contaminants. It is also obvious to those skilled in the art that all of the higher calorific value fuel or only a portion can be directly injected into the combustor through a separate fuel manifold to realize the benefits of this invention.

Figure 3:
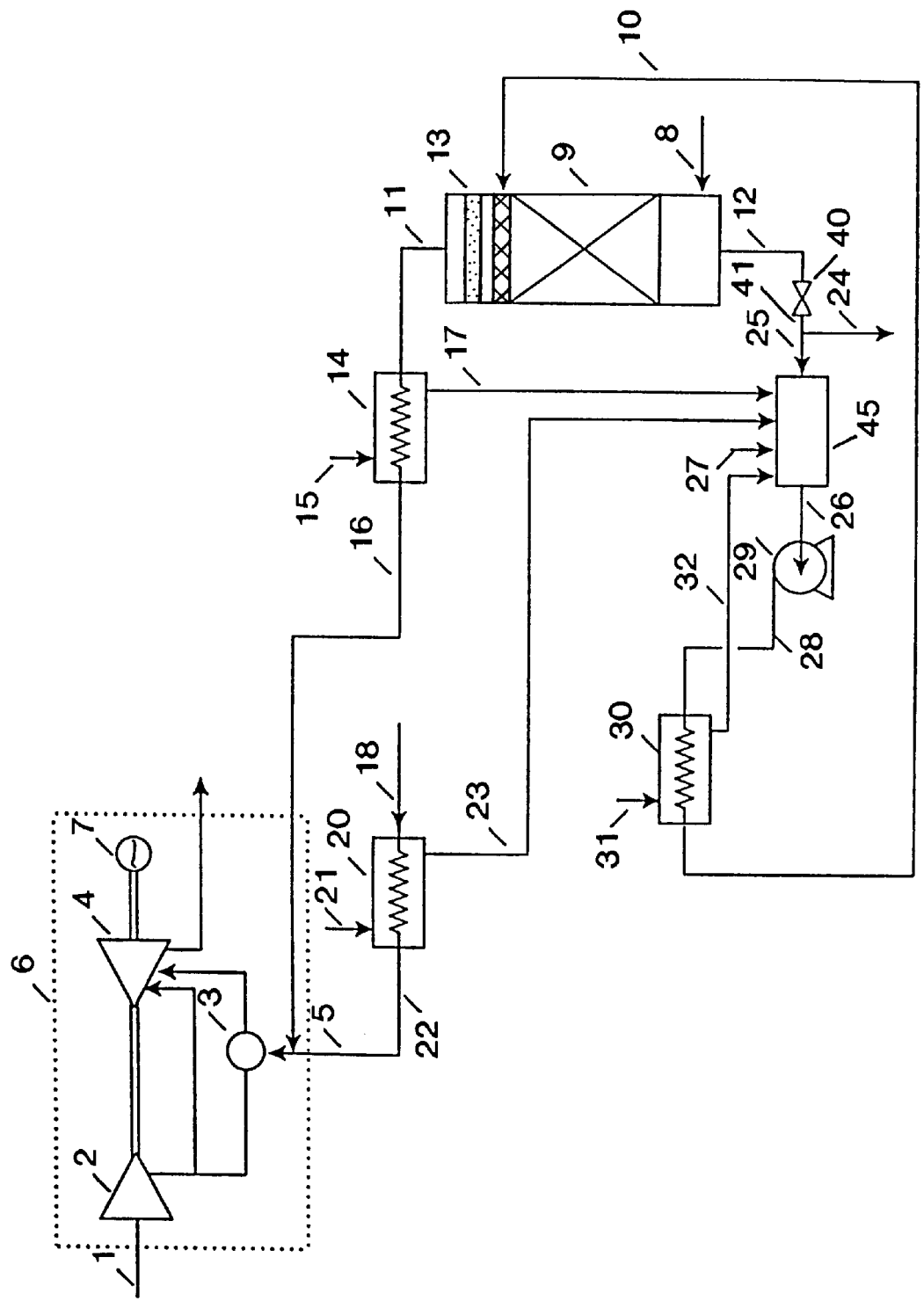
FIG. 3 is a schematic showing separate superheaters for the moist nitrogen and fuel streams.

FIG. 3 is a schematic representation of an alternate process arrangement of the invention for increasing the electric power output of a gas turbine and lowering NOx emissions. The diluent (nitrogen or nitrogen and water vapor mixture) is superheated in superheater 14, and the fuel is heated separately in fuel heater 20. The intent is to comply with the superheat guidelines established by the gas turbine manufacturer to prevent liquid entrainment or condensation into the fuel manifold. Several heat exchange arrangements are obvious to those skilled in the art to accomplish this objective. For example one variant can completely eliminate the fuel heater while increasing the diluents superheat duty such that mixing the fuel and diluent gas will not result in condensate formation.

With reference to FIG. 3, steam flowing through lines 15, 21 and 31 could be derived from the same steam source, even though it results in some thermodynamic inefficiencies. Steam through line 27 could also be derived from the same source or from a lower pressure source such as 50 psig steam. At a given saturator operating pressure, higher circulating (recycle) water temperature results in higher moisturization levels of the saturator overhead gas. This invention therefore enables optimizing saturator design and operation to obtain higher gas turbine power output with minimum heat rate penalties.

Figure 4:
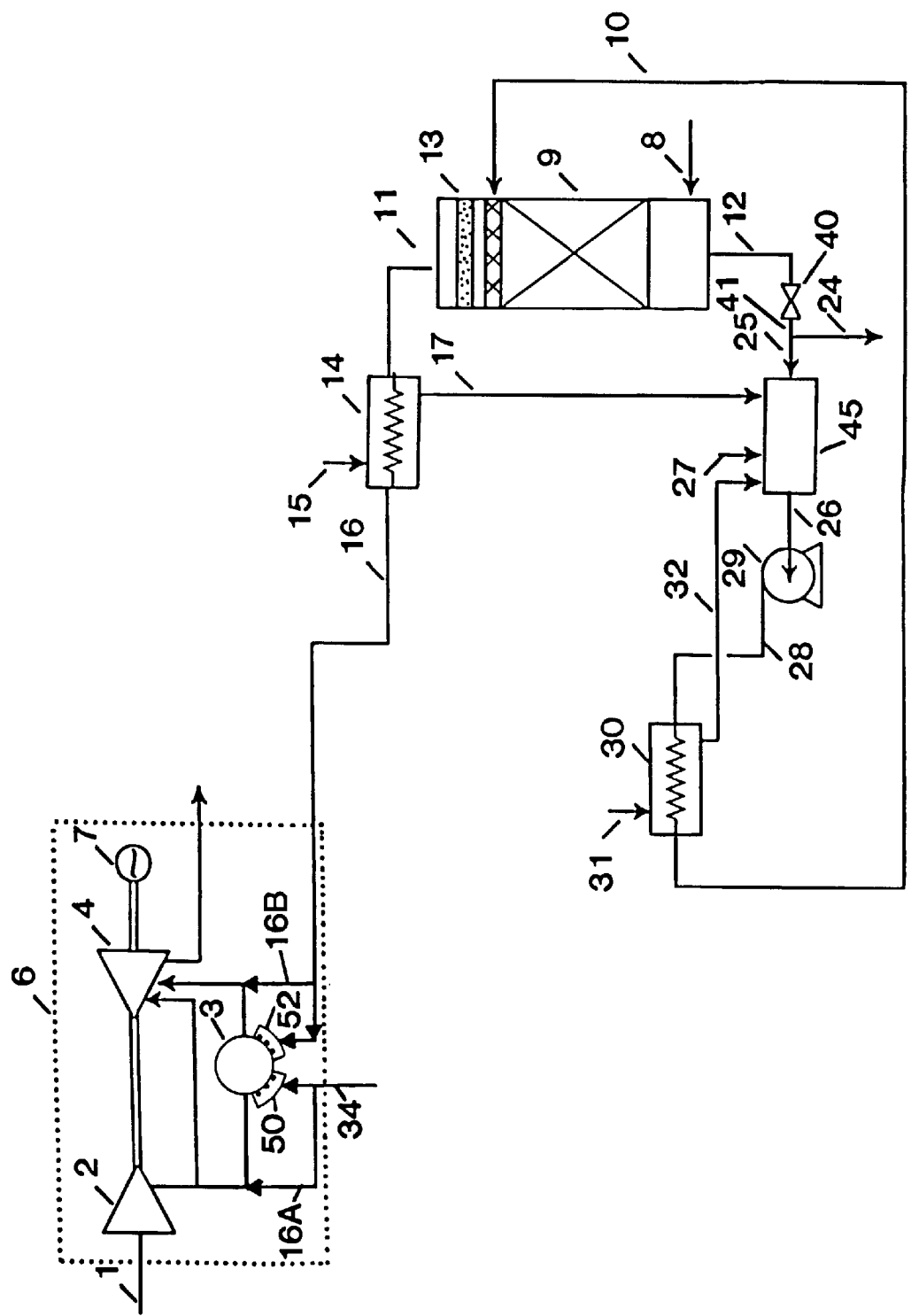
FIG. 4 is a schematic of another embodiment wherein all of the fuel is fed to the combustor through a separate fuel gas manifold.

FIG. 4 is another arrangement of the process equipment. All of the fuel 34 is fed to the combustor through the separate fuel gas manifold 50. The diluent, nitrogen and/or mixture of nitrogen and water vapor is injected into the gas turbine separately from the fuel through manifold 52. Possible alternates not shown in FIG. 4, but are obvious to those skilled in the art include injection of the diluent gas into gas turbine air compressor discharge, and/or combustor exhaust through lines 16A and/or 16B respectively.

Figure 5:
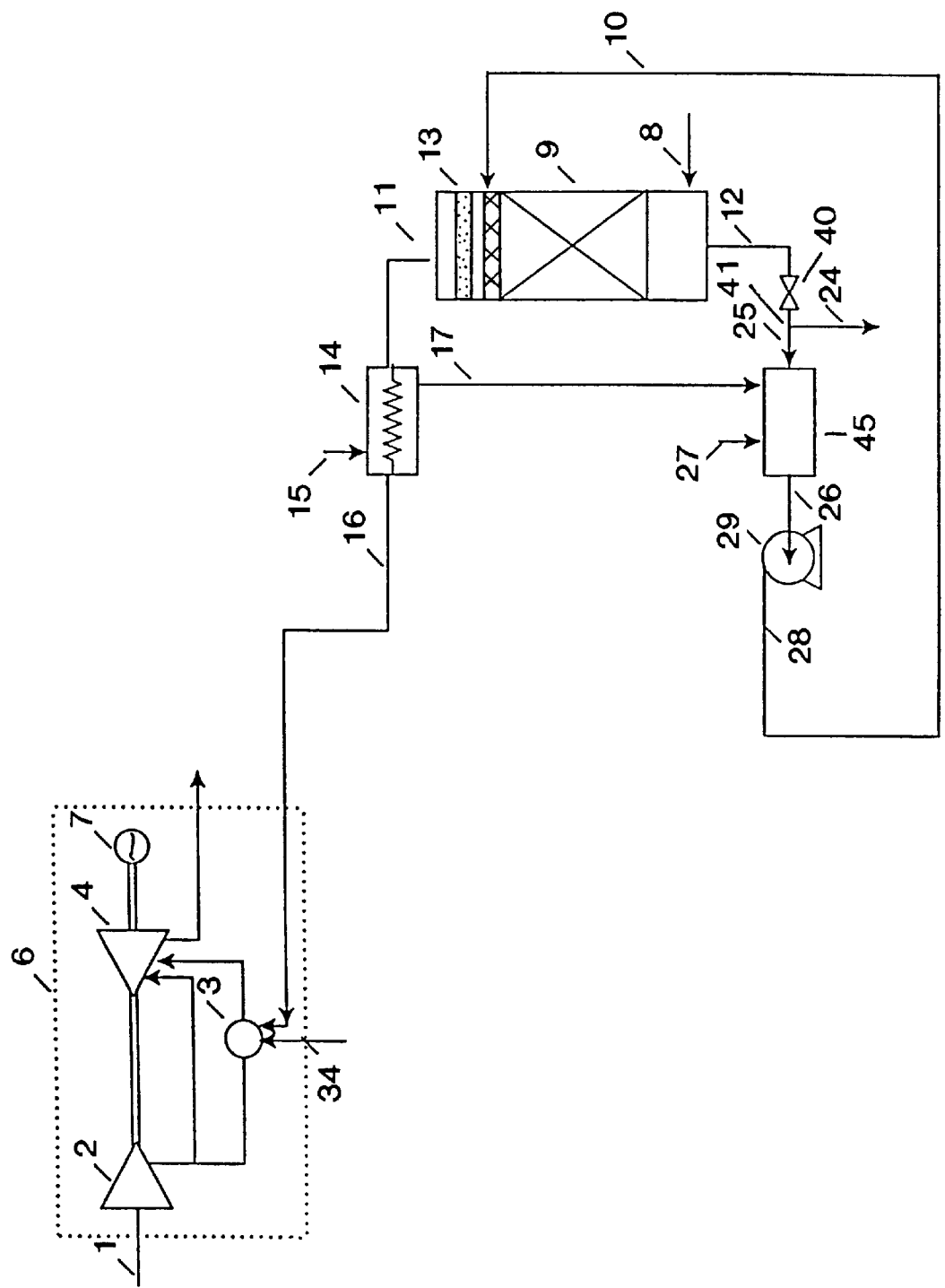
FIG. 5 is a schematic of another embodiment wherein steam used is in sufficient pressure and temperature such that the recycle water is fed to the saturator without additional heating.

FIG. 5 is another arrangement of the process equipment to practice the invention. Steam at sufficient pressure and temperature is used in lines 15 and/or 27 such that the recycle water in line 28 is fed to the saturator 9, without additional heating.

The process arrangements described above, together with their variants for heat exchangers arrangements, fuel and diluent injection locations in the gas turbine that are not described but are obvious to those skilled in the art constitute the invention to increase power output and lower NOx emissions over a range of operating conditions. The invention discloses a process and apparatus for adding nitrogen or a mixture of nitrogen and water vapor to the gas turbine in conjunction with the use of low pressure steam to minimize heat rate penalties. It is particularly applicable to situations where the gas turbine compressor is the bottleneck due to site conditions. It is also particularly applicable where significant low grade heat such as low pressure steam is available. Table 1, below, summarizes the benefits of this invention.

TABLE 1

Gas Turbine Capacity Enhancement Using Moisturized Nitrogen (Nitrogen and Water Vapor Mixture)

| Gas Turbine Fuel @ 275 psig | Incremental Gas Turbine Shaft Work, % Base* | Incremental H Rate, Btu/kWh |
|---|---|---|
| Natural Gas | Base | — |
| 35% Natural Gas, | 14 | 5,267 |

TABLE 1-continued

Gas Turbine Capacity Enhancement Using Moisturized Nitrogen (Nitrogen and Water Vapor Mixture)

| Gas Turbine Fuel @ 275 psig | Incremental Gas Turbine Shaft Work, % Base* | Incremental H Rate, Btu/kWh |
| --- | --- | --- |
| 32.5% Nitrogen, balance Water Vapor | | |

*Base: GT Shaft Work, kW = 64598
Heat Rate Btu/kWh = 10860
**Delta heat rate = incremental fuel consumption/incremental GT shaft work.

Various other modifications of the disclosed embodiments, as well as other embodiments of the invention, will be apparent to those skilled in the art upon reference to this description, or may be made without departing from the spirit and scope of the invention defined in the appended claims.

What is claimed is:

1. An apparatus for the addition of nitrogen and moisture derived from low pressure steam to the fuel gas utilized to drive a gas turbine comprising:
   (a) a saturator tower adapted for the contacting of nitrogen gas with a hot water stream to form a mixture of water vapor and nitrogen gas;
   (b) conduit means for passing the mixture of water vapor and nitrogen gas to a heat exchanger unit where low pressure steam is used to produce a superheated mixture of water vapor and nitrogen gas;
   (c) conduit means for passing the superheated mixture to a chamber for mixing with feed gas to form a fuel gas mixture;
   (d) conduit means for passing the fuel gas mixture of fuel gas, nitrogen and water vapor mixture to a heat exchanger where low pressure steam is used to produce a superheated fuel gas mixture;
   (e) conduit means for passing the superheated fuel gas mixture to a gas turbine combustor.

2. The apparatus of claim 1 with:
   (a) pressure reduction means for water leaving the saturator to facilitate heating of the water by direct contact with low pressure steam, or condensate, or two phase steam-condensate mixture;
   (b) repressurization means to return the hot water to the saturator; and,
   (c) indirect heating means to heat the water from the saturator for recycle to the saturator.

3. An apparatus for the addition of nitrogen and moisture to fuel gas utilized to drive a gas turbine, the gas turbine having a minimum fuel delivery pressure, comprising:
   (a) a feed line for feeding a high calorific fuel gas and nitrogen gas;
   (b) a saturator tower connected to the feed line, the saturator tower being adapted for the contacting of both the nitrogen gas and the high calorific fuel gas with a hot water stream to form a fuel mixture of water vapor, nitrogen gas, and fuel gas;
   (c) a conduit for passing the fuel mixture to a heat exchanger unit where low pressure steam produces a superheated fuel mixture, the low pressure steam having a pressure less than the minimum fuel delivery pressure of the gas turbine;
   (d) a conduit for mixing the low pressure steam from the heat exchanger unit with the hot stream of water for heating the hot stream of water for use in the saturator; and
   (e) a conduit for passing the superheated fuel mixture to a gas turbine combustor.

4. A process for increasing the power output of a gas turbine system having an air compressor for producing compressed air and an air compressor discharge for discharging air into a combustor for heating said compressed air and producing hot gases, which are exhausted through a combustor exhaust into an expander responsive to said hot gases for driving said air compressor and a load, the gas turbine having a minimum fuel delivery pressure, comprising the steps of:
   a) contacting nitrogen gas with a hot water stream in a saturator tower to form a mixture of water vapor and nitrogen gas;
   b) passing the mixture of water vapor and nitrogen gas to a heat exchanger unit where low pressure steam produces a superheated mixture of water vapor and nitrogen gas, the low pressure steam having a pressure less than the minimum fuel delivery pressure of the gas turbine;
   c) mixing low pressure steam from the heat exchanger unit with the hot water stream to heat the hot water stream for use in step a);
   d) passing fuel gas to the combustor; and
   e) passing the mixture of water vapor and nitrogen gas to at least one of the air compressor discharge, combustor and combustor exhaust.

5. The method of claim 4 wherein the passing introduces the mixture of water vapor and nitrogen gas to the air compressor discharge of the gas turbine.

6. The method of claim 4 wherein the passing introduces the mixture of water vapor and nitrogen gas to the combustor of the gas turbine.

7. The method of claim 4 wherein the passing introduces the mixture of water vapor and nitrogen gas to the combustor exhaust of the gas turbine.

8. A process for adding nitrogen and moisture to fuel gas utilized to drive a gas turbine, the gas turbine having a minimum fuel delivery pressure, comprising the steps of:
   a) contacting a mixture of high calorific fuel gas and nitrogen gas with a hot water stream in a saturator tower to form a fuel mixture of water vapor, nitrogen gas and fuel gas;
   b) passing the fuel mixture of water vapor, nitrogen gas and fuel gas to a heat exchanger unit where low pressure steam produces a superheated fuel mixture of water vapor, nitrogen gas and fuel gas, the low pressure steam having a pressure less than the minimum fuel delivery pressure of the gas turbine;
   c) mixing low pressure steam from the heat exchanger unit with the hot water stream to heat the hot water stream for use in step b);
   d) passing the fuel mixture of water vapor, nitrogen gas and fuel gas to the combustor.

9. An apparatus for increasing the power output of a gas turbine system having an air compressor for producing compressed air and an air compressor discharge for discharging air into a combustor for heating said compressed air and producing hot gases, which are exhausted through a combustor exhaust into an expander responsive to said hot gases for driving said air compressor and a load, the gas turbine having a minimum fuel delivery pressure, comprising:

(a) a feed line for feeding a nitrogen gas;
(b) a saturator tower connected to the feed line, the saturator tower being adapted for the contacting of the nitrogen gas with a hot water stream to form a mixture of water vapor and nitrogen gas;
(c) a conduit for passing the mixture of water vapor and nitrogen gas to a heat exchanger unit where low pressure steam produces a superheated mixture of water vapor and nitrogen gas, the low pressure steam having a pressure less than the minimum fuel delivery pressure of the gas turbine;
(d) a conduit for mixing the low pressure steam from the heat exchanger unit with the hot stream of water for heating the hot stream of water for use in the saturator; and
(e) a conduit for passing the superheated mixture of water vapor and nitrogen gas to at least one of the air compressor discharge, combustor and combustor exhaust.

10. The apparatus of claim 9 wherein the conduit of item (e) passes the mixture of water vapor and nitrogen gas to the air compressor discharge of the gas turbine.

11. The apparatus of claim 9 wherein the conduit of item (e) passes the mixture of water vapor and nitrogen gas to the combustor of the gas turbine.

12. The apparatus of claim 9 wherein the conduit of item (e) passes the mixture of water vapor and nitrogen gas to the combustor exhaust of the gas turbine.

* * * * *